(12) United States Patent
Gaull et al.

(10) Patent No.: US 9,849,758 B2
(45) Date of Patent: Dec. 26, 2017

(54) COMPONENT ARRANGEMENT AND METHOD FOR PRODUCING THE COMPONENT ARRANGEMENT

(71) Applicant: Audi AG, Ingolstadt (DE)

(72) Inventors: Gerhard Gaull, Neuburg (DE); Gundolf Kreis, Oberstimm (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/958,639

(22) Filed: Dec. 3, 2015

(65) Prior Publication Data

US 2016/0159208 A1     Jun. 9, 2016

(30) Foreign Application Priority Data

Dec. 4, 2014   (DE) .................. 10 2014 017 921

(51) Int. Cl.
| | |
|---|---|
| *B60J 5/04* | (2006.01) |
| *B23K 26/24* | (2014.01) |
| *B23K 26/22* | (2006.01) |
| *B23K 26/26* | (2014.01) |
| *B23K 101/00* | (2006.01) |
| *B23K 101/18* | (2006.01) |

(52) U.S. Cl.
CPC ............ *B60J 5/0463* (2013.01); *B23K 26/22* (2013.01); *B23K 26/24* (2013.01); *B23K 26/26* (2013.01); *B60J 5/0402* (2013.01); *B60J 5/045* (2013.01); *B60J 5/0483* (2013.01); *B23K 2201/006* (2013.01); *B23K 2201/185* (2013.01)

(58) Field of Classification Search
CPC ........ B60J 5/0463; B60J 5/045; B60J 5/0483; B23K 26/24; B23K 2201/006

USPC ........................................... 49/502
See application file for complete search history.

(56) References Cited

U.S. PATENT DOCUMENTS

| | | | | |
|---|---|---|---|---|
| 5,595,415 A | * | 1/1997 | Beaulat | ............... 296/39.1 |
| 6,119,405 A | * | 9/2000 | Disson et al. | ............. 49/502 |
| 7,914,066 B2 | * | 3/2011 | Miyake et al. | ........ 296/146.6 |
| 2006/0273620 A1 | | 12/2006 | Husner et al. | |
| 2007/0119101 A1 | * | 5/2007 | Mattsson | ................ 49/502 |
| 2007/0145773 A1 | * | 6/2007 | Saitoh | ............... 296/146.8 |

(Continued)

FOREIGN PATENT DOCUMENTS

| | | |
|---|---|---|
| CN | 102248298 A | 11/2011 |
| CN | 102581486 A | 7/2012 |

(Continued)

OTHER PUBLICATIONS

Chinese Search Report issued by the Chinese Patent Office in Chinese Application No. 2015108825401 dated Jul. 19, 2017.

(Continued)

*Primary Examiner* — Jerry Redman
(74) *Attorney, Agent, or Firm* — Henry M. Feiereisen LLC

(57) ABSTRACT

A component arrangement includes a first sheet metal profile part and a second sheet metal profile, each first and second profile parts having respective flanges and being arranged relative to each other so that the respective flanges overlap, wherein the first and second profile parts are connected to each at the respective flanges via a laser welding connection, which extends over a welding seam length, wherein the laser welding connection is formed by at least two welding seams which extend parallel and at a distance to each other.

10 Claims, 2 Drawing Sheets

(56) References Cited

U.S. PATENT DOCUMENTS

2010/0102590 A1\* 4/2010 Miyake et al. ............ 296/146.8
2011/0181143 A1\* 7/2011 Hasegawa et al. ........... 310/180

FOREIGN PATENT DOCUMENTS

| CN | 103025470 A | 4/2013 |
|----|----|----|
| CN | 103648812 A | 3/2014 |
| CN | 103707745 A | 4/2014 |
| CN | 104125872 A | 10/2014 |
| DE | 1 950 002 | 3/1971 |
| DE | 196 40 754 | 4/1997 |
| DE | 100 51 211 | 4/2002 |
| DE | 102 35 855 | 3/2004 |
| DE | 103 17 552 | 1/2005 |
| DE | 102004026427 | 12/2005 |
| DE | 102010029477 | 12/2011 |
| DE | 102013001213 | 7/2014 |
| EP | 0754815 A1 | 1/1997 |
| EP | 1 674 191 | 6/2006 |
| EP | 2716400 B1 | 4/2017 |

OTHER PUBLICATIONS

English translation of Chinese Search Report issued by the Chinese Patent Office in Chinese Application No. 2015108825401 dated Jul. 19, 2017.

\* cited by examiner

Section I-I

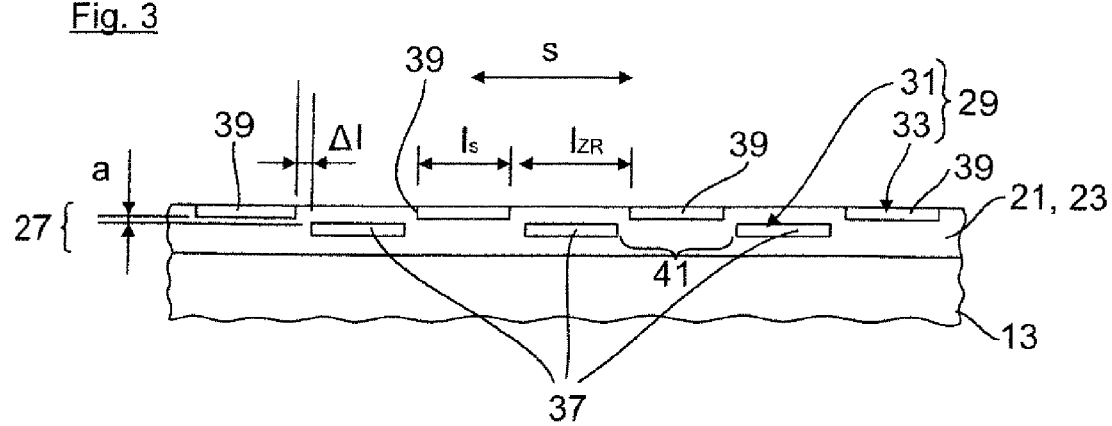
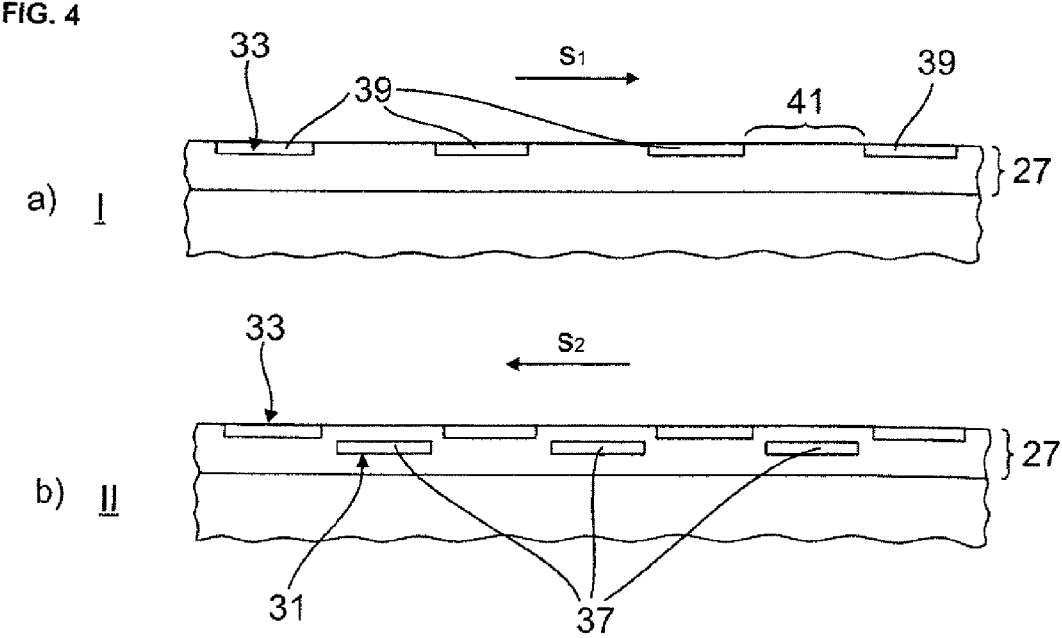

COMPONENT ARRANGEMENT AND METHOD FOR PRODUCING THE COMPONENT ARRANGEMENT

CROSS-REFERENCES TO RELATED APPLICATIONS

This application claims the priority of German Patent Application, Serial No. 10 2014 017 921.4, filed Dec. 4, 2014, pursuant to 35 U.S.C. 119(a)-(d), the disclosure of which is incorporated herein by reference.

BACKGROUND OF THE INVENTION

The present invention relates to a component arrangement with a first sheet metal profile apart and a second sheet metal profile part which are connected to each other at overlapping component flanges via a laser welding connection, which extends over a weld seam length.

The following discussion of related art is provided to assist the reader in understanding the advantages of the invention, and is not to be construed as an admission that this related art is prior art to this invention.

In motor vehicle construction the vehicle door is usually constructed from a inner sheet metal part and a outer sheet metal part. Especially the frame section of the vehicle door that surrounds a side window has to satisfy high demands with regard to frame stiffness.

In order to satisfy the demands on frame stiffness, especially when producing vehicle doors, the inner and/or outer sheet metal parts are usually configured to have an increased material thickness, which however, leads to increased component costs and increased component weight.

It would therefore be desirable and advantageous to provide a component arrangement in which a rigid welding connection is reliably generated, and which in particular also meets the required frame stiffness of a vehicle door.

SUMMARY OF THE INVENTION

According to one aspect of the present invention, a component arrangement, includes a first sheet metal profile part and a second sheet metal profile, each first and second profile parts having respective flanges and being arranged relative to each other so that the respective flanges overlap, wherein the first and second profile parts are connected to each other at the respective flanges via a laser welding connection, which extends over a welding seam length, wherein the laser welding connection is formed by at least two welding seams which extend parallel and at a distance to each other Instead of increasing the sheet metal thickness, the laser welding connection according to the invention between the two sheet metal profile parts is formed by at least two welding seams that extend at a distance and parallel to each other. When viewed in the welding processing direction the two parallel welding seams extend over a predetermined welding-seam-length.

The component arrangement according to the invention can be used in vehicle construction for producing different vehicle body add-on parts, for example vehicle doors, vehicle hatches and/or mudguards which are conventionally constructed from inner and outer sheet metal parts, which are profiled separate from each other and are subsequently joined at border flanges, i.e., so as to form a hollow profile. The component arrangement generally described above can be a vehicle door with a window frame of the type installed in the region of the A-column and the B-column of a vehicle. The window frame enclosing the side window is in this case a hollow profile when viewed in cross section, which is formed by shell-shaped inner and outer sheet metal parts, which each have two border flanges that protrude laterally outwards. The confronting border flanges of the inner and outer sheet metal parts are welded together so as to form a lap joint region, i.e., so as to form a hollow profile. By means of the welded connected, which according to the invention is divided into two laser-welding seams, the stiffness of the connection can be significantly increased without having to increase the material thickness.

According to another advantageous feature of the invention the two parallel laser-welding seams can extend continuously over the entire length of the welding, i.e., without interruption. However, during the laser welding process this subjects the two border flanges of the components to a significant localized heat input in the lap joint region, which may result in warping of the components.

It is therefore preferred when at least one, in particular both, welding seams are configured as stitch-welding seams that are formed by individual seam segments which are spaced apart by gaps when viewed in the welding processing direction. For further reducing heat influx during the welding process it is preferred when the seam segments of the first stitch-welding seam and the seam segments of the second stitch-welding seam are arranged in offset succession (i.e., alternately) relative to each other when viewed in the welding processing direction.

According to another advantageous feature of the invention, the seam segments of the first and second stitch-welding seams can overlap each other transverse to the welding processing direction. However, it is preferred when the seam segments of the two stitch-welding seams are arranged in alternating succession relative to each other in the welding processing direction, i.e., so that a seam segment of the first welding seam is spaced apart from the seam segment of the second welding seam in welding processing direction neighboring by a longitudinal offset. Such a specific welding configuration not only results in a significantly reduced heat influx during the welding process and therefore in a warp-resistant component arrangement. In addition this welding configuration results in a band-shaped stiffening structure, which increases the frame stiffness, while extending at least partially along the window frame of the vehicle door.

In the above defined welding configuration the seam segments of the first stitch welding seam and the second stitch welding seam can be configured geometrically identical, i.e., they can have approximately the same segment length when viewed in welding processing direction. In addition also the gaps of the seam segments can have the same or different lengths when viewed in welding processing direction.

The welding process can preferably be divided into two subsequent process steps: in the first process step the first welding seam can be produced, wherein temporally subsequent thereto in the second process step the second welding seam is generated. By means of the succeeding process steps the heat introduction can be reduced—compared to simultaneous process steps. For further reducing heat introduction, the first welding seam can be generated in the first process step in a first welding processing direction. After completing the first process step the second welding seam can be generated in a second, opposite welding processing direction.

As mentioned above, the component arrangement can be realized as any desired add-on part of a vehicle body, for example the add-on part can also be a front or rear hatch or a mudguard.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 shows a schematic view of the laser welding connection according to the invention; and FIG. 4 shows a schematic representation of the laser welding process according to the invention.

DETAILED DESCRIPTION OF PREFERRED EMBODIMENTS

Figure 1:
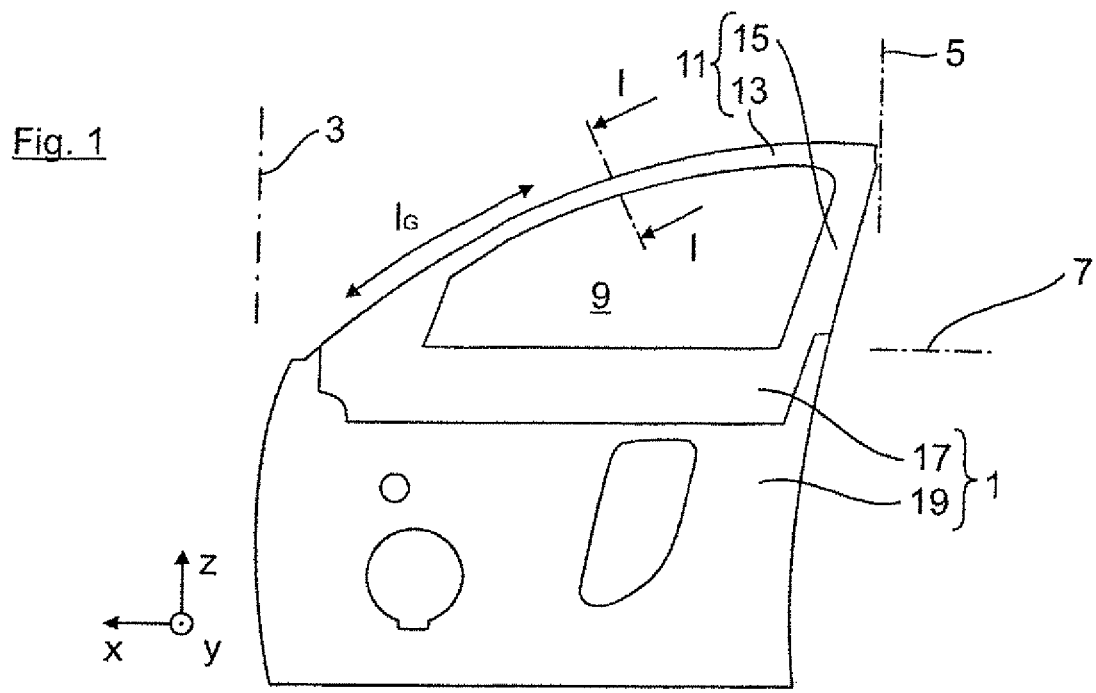
FIG. 1 shows a side view of a component arrangement realized as vehicle side door.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a vehicle side door 1 without panel elements and in an installed position in the motor vehicle. Thus the vehicle side door 1 can be installed between an A-column 3 and a B-column 5 in a side structure of a not shown vehicle body. Above an indicated sill line 7, the vehicle door 1 has a side window 9, which is delimited by a window frame 11, which has an upper longitudinal frame part 13 extending in longitudinal direction x of the vehicle, adjoined by a frame part 15, which extends vertically in z-direction. The vehicle door 1 is formed by an inner sheet metal part 17 and an outer sheet metal part 19.

Figure 2:
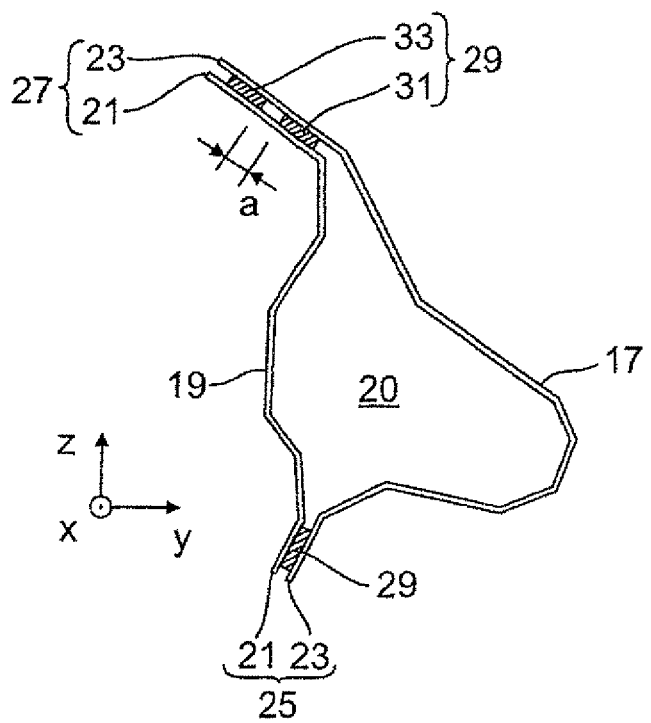
FIG. 2 shows a sectional view of the component arrangement taken along the sectional plane I-I of FIG. 1.

As can be seen from FIG. 2, the window frame 11 is configured as a hollow beam, in which the two sheet metal parts 17 and 19 have respectively a shell-like profile, i.e., each having border flanges 21, 23. In FIG. 2 the border flanges 21, 23 of the two sheet metal parts 17, 19, which laterally protrude outwardly, are each joined together at two lap joint regions 25, 27 by means of laser welding 29. A hollow profile 20 is arranged between the two lap joint regions 25, 27. The two laser welding connections extend continuously, i.e., without interruption, along the two frame parts 13, 15 of the window frame 11.

As can further be seen in FIG. 2, the laser welding connection 29 that extends outside along the upper frame part 13 is formed by two welding seams 31, 33, which extend parallel to each other and are spaced apart by a distance a (FIG. 2 or 3). On the other hand the laser welding connection 29 that extends along the inner lap joint 27 is only formed by a single welding seam 35. The two welding seams 31, 33 of the outer laser welding connection 29 extend over a total length $I_G$ of almost over the entire upper frame part 13.

In the following the welding geometry of the two welding seams 31, 33 is described with reference to FIG. 3: the two welding seams 31, 33 are each configured as stitch-welding seams, which are formed by individual seam segments 37, 39. The seam segments 37, 39 of the two welding seams 31, 33 are arranged alternate behind each other in a welding processing direction S, i.e., positioned in alternating succession. This results in a welding configuration in which a seam segment 37 of the first welding seam 31 is spaced apart from a neighboring seam segment 37 of the second welding seam 33 in the welding processing direction S by a longitudinal offset ΔI. Correspondingly the seam segments 37, 39, which are arranged in two tracks and alternate in welding processing direction S, are spaced apart via gaps 41 whose length $I_{ZR}$ is respectively greater than the segment length $I_S$ of the seam segments 37, 39. In addition all seam segments 37, 39 are configured to have the same segment length $I_S$. Similarly also the gaps 41 are configured identical in both welding seams 31, 33. Preferably the segment length $I_S$ can be about 30 mm, wherein the distance a is for example 5 mm and the longitudinal offset ΔI can also be about 5 mm. The lengths, distances and offsets, however, may also be different from the shown embodiment and can be adjusted freely to the respective geometric conditions.

FIG. 4 illustrates the welding process. As illustrated under a) a first laser welding seam 31 is first generated by means of a not shown welding robot, i.e., by moving the laser welding robot along the outer lap joint 27 of the upper frame part 13 in a first welding processing direction $S_1$. After completing this first process step I, the laser welding robot is moved back in a direction $S_2$ opposite to the first welding processing direction $S_1$, i.e., so as to form the second welding seam 33 as indicated under b).

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for producing a vehicle door, comprising:
providing a first sheet metal profile part and a second sheet metal profile part, each having respective flanges;
arranging the first and second sheet metal profile parts relative to each other so that the respective flanges overlap;
connecting the first and second sheet metal profile parts to each other at the respective flanges via a laser welding connection, which extends over a welding seam length, said laser welding connection being formed by at least two welding seams which extend parallel and at a distance to each other, wherein the at least two welding seams are configured as stitch-welding seams which are formed by segments which are spaced apart in a welding processing direction via gaps, and generating the at least two welding seams in separate temporally subsequent process steps.

2. A component arrangement, comprising:

a first sheet metal profile part having an end forming a border flange protruding laterally outward;

a second sheet metal profile part having an end forming a border flange which protrudes laterally outward and is sized to overlap the border flange of the first sheet metal profile part along a lap joint region in substantial parallel relationship, said first and second sheet metal profile parts defining inner and outer sheet metal profile parts and together forming a hollow profile; and a laser welding connection connecting the border flange of the first sheet metal profile part with the border flange of the second sheet metal profile part within the lap joint region, said laser welding connection being formed within the lap joint region by at least two stitch-welding seams which extend parallel and at a distance to each other and are formed by seam segments which are spaced apart in a welding processing direction via gaps.

3. The component arrangement of claim 2, wherein the seam segments of one of the stitch-welding seams and the seam segments of the other one of the stitch-welding seams are offset relative to each other along the welding processing direction.

4. The component arrangement of claim 3, wherein the seam segments of the stitch-welding seams are configured geometrically identical.

5. The component arrangement of claim 3, wherein the seam segments have a same segment lengths as viewed in the welding processing direction.

6. The component arrangement of claim 3, wherein the gaps of the seam segments have a same length as viewed in the welding processing direction.

7. The component arrangement of claim 2, wherein the seam segments of the stitch-welding seams are arranged in alternating succession to each other in the welding processing directions.

8. The component arrangement of claim 2, wherein the at least two stitch-welding seams are generated in subsequent process steps in opposite processing directions.

9. The component arrangement of claim 2, wherein the two stitch-welding seams extend at an offset to one another in a direction transverse to the welding processing direction.

10. The component arrangement of claim 2, wherein the offset is about 5 mm.

* * * * *